US007352888B2

United States Patent
Luo et al.

(10) Patent No.: US 7,352,888 B2
(45) Date of Patent: Apr. 1, 2008

(54) METHOD FOR COMPUTER RECOGNITION OF PROJECTION VIEWS AND ORIENTATION OF CHEST RADIOGRAPHS

(75) Inventors: Hui Luo, Rochester, NY (US); Craig W. Cornelius, Menlo Park, CA (US)

(73) Assignee: Carestream Health, Inc., Rochester, NY (US)

( * ) Notice: Subject to any disclaimer, the term of this patent is extended or adjusted under 35 U.S.C. 154(b) by 691 days.

(21) Appl. No.: 10/903,050

(22) Filed: Jul. 30, 2004

(65) Prior Publication Data

US 2006/0023929 A1 Feb. 2, 2006

(51) Int. Cl.
*G06K 9/00* (2006.01)
(52) U.S. Cl. ............... 382/132; 382/128; 382/199; 382/288; 382/289
(58) Field of Classification Search ................ 382/132, 382/199, 289, 128, 131, 288
See application file for complete search history.

(56) References Cited

U.S. PATENT DOCUMENTS

| 4,870,694 A * | 9/1989 | Takeo ........................ 382/128 |
| 4,951,201 A * | 8/1990 | Takeo et al. ................ 382/128 |
| 5,533,143 A * | 7/1996 | Takeo ........................ 382/132 |
| 5,862,249 A | 1/1999 | Jang et al. |
| 6,011,862 A * | 1/2000 | Doi et al. .................... 382/132 |
| 6,055,326 A | 4/2000 | Chang et al. |
| 7,043,066 B1 * | 5/2006 | Doi et al. .................... 382/132 |
| 2002/0021829 A1 | 2/2002 | Doi et al. |
| 2004/0109595 A1 * | 6/2004 | Luo et al. .................... 382/132 |
| 2004/0161141 A1 * | 8/2004 | Dewaele ...................... 382/132 |

OTHER PUBLICATIONS

Michael G. Evanoff, Kevin M. McNeill, Automatically Determining the Orientation of Chest Images, SPIE, vol. 3035, pp. 299-308.
John M. Boone, Sadananda Seshagiri, Robert M. Steiner, Recognition of Chest Radiograph Orientation For Picture Archiving And Communications Systems Display Using Neural Networks, Journal of Digital Imaging, vol. 5, No. 3, Aug. 1992, pp. 190-193.
Ewa Pietka, H.K. Huang, Orientation Correction for Chest Images, Journal of Digital Imaging, vol. 5, No. 3, 1992, pp. 185-189.
Hidetaka Arimura et al., Development of a Computerized Method For Identifying the Posteroanterior and Lateral Views of Chest Radiographs by Use of a Template Matching Technique, Med. Phys. 29 (7), Jul. 2002, pp. 1556-1561.
Thomas M. Lehmann, et al., Automatic Detection of the View Position of Chest Radiographs, SPIE Proceeding, vol. 5032, pp. 1-8.

* cited by examiner

*Primary Examiner*—Jefferey Harold
*Assistant Examiner*—Daniel Zeilberger

(57) ABSTRACT

A method for identifying a projection view and an orientation of a chest radiograph. The method includes the steps of: providing an input digital image of the chest radiograph; preprocessing the input digital radiographic image; classifying the view of the input digital radiographic image; and determining the orientation of the input digital radiographic image.

23 Claims, 11 Drawing Sheets

METHOD FOR COMPUTER RECOGNITION OF PROJECTION VIEWS AND ORIENTATION OF CHEST RADIOGRAPHS

FIELD OF INVENTION

The present invention relates generally to techniques for the processing radiographs, and more particularly to techniques for automated processing of chest radiographs. More specifically, the present invention is directed to techniques for automatically recognizing the projection views and orientation of chest radiographs.

BACKGROUND OF THE INVENTION

Chest radiography is a widely used technique in diagnostic imaging of medical images. It can make up at least a third of all conventional diagnostic radiographic procedures in a general hospital. A conventional radiographic chest examination includes two projection views. One view is a posterior-anterior (PA) or anterior-posterior (AP) projection view, while the other view is a lateral (LAT) projection view.

Medical professionals using such radiographic chest examinations often prefer to view the images in standardized ways, which require the proper position of the image with a particular view (i.e., AP/PA or LAT) relative to the other and the correct orientation of each. However, some x-ray exposures are acquired before they are actually processed to produce visible images. Both film-screen and computed radiography (CR) methods are examples of where x-ray exposures are acquired before they are actually processed to produce visible images. As such, a film or a CR cassette can be exposed for either of a LAT or PA/AP view, and the orientation of the image with respect to the patient may vary for each exposure to accommodate the examination conditions. Accordingly, these exposures/images are often digitized with the view and orientation unknown or mislabeled.

Hence, a method for automatically recognizing the projection view and the patient-relative orientation of chest radiographs would be very useful. Such a method would reduces the incidence of mislabeled or unlabeled images and save time used to reorient images. Thus, such a method would improve the efficiency and effectiveness of automated electronic image management and display.

Some work has been initiated to determine the orientation and view of chest radiographs.

Pieka et al. ("Orientation Correction for Chest Images", Journal of Digital Imaging, Vol. 5, No. 3, 1992) presented an automatic method to determine the projection and orientation of chest images using two projection profiles of images, which are obtained by calculating the average densities along horizontal and vertical lines.

Boone et. al. ("Recognition of Chest Radiograph Orientation for Picture Archiving and Communication Systems Display Using Neural Networks", Journal of Digital Imaging, Vol. 5, No. 3, 1992) used an artificial neural network to classify the orientation of chest radiographs. The features extracted include two projection profiles and four regions of interest. Evanoff et. Al. ("Automatically Determining the Orientation of Chest Images", SPIE Vol 3035) applied linear regression on two orthogonal profiles to determine the top of the image, then sought the edge of heart to determine if the image requires reorientation. However, the two profiles mentioned in the above methods are very sensitive to noise in the images and the projection profile's features are not sufficiently detailed to allow differentiation of the PA and LAT projection views.

Arimura et al. ("Development of a computerized method for identifying the posteroanterior and lateral views of chest radiographs by use of a template matching technique", Med. Phys. 29(7) July 2002 and U.S. Pat. Application No.2002/0021829 entitled METHOD, SYSTEM AND COMPUTER READABLE MEDIUM FOR IDENTIFYING CHEST RADIOGRPAHS USING IMAGE MAPPING AND TEMPATE MATCHING TACHNIQUES) proposed a method to distinguish the PA or LAT projection views by examining the similarity of a chest image with pre-defined template images. However, the manual generation of the template images is quite time consuming, and more particularly, is highly observer dependent, which can introduce error into the classification.

Lehmann et al. ("Automatic Detection of the View Position of Chest Radiographs", SPIE Proceeding, Vol. 5032) addressed Arimura's method by using only one template image and identifying the different views using the K-nearest-neighbor classifier. However, both template-matching methods suffer problems in handling rotation and translation variance of an individual patient's chest radiograph. In addition, the methods do not address the interference of noise or unrelated regions which can cause seriously biased classification results.

U.S. Pat. No. 5,862,249 issued Jan. 19, 1999 to Jang et al. entitled AUTOMATED METHOD AND SYSTEM FOR DETERMINATION OF POSITIONAL ORIENTATION OF DIGITAL RADIOGRAPHIC IMAGES is directed to a method for determining the orientation of images by means of multi-stage processing. The region of interest (ROI) is segmented from the chest image, and a set of rules is applied to determine the orientation of the image.

U.S. Pat. No. 6,055,326 issued Apr. 25, 2000 to Chang et al. entitled METHOD FOR ORIENTING ELECTRONIC MEDICAL IMAGES is directed to a method employing image segmentation and rules to determine the projection view type of a chest X-ray image and, based on the boundary of body parts, to determine orientation of the X-ray image. The method is disadvantaged for actual application since it is quite complicated; the rules are based only on the boundary information of the images, which is not reliable in most chest images because of variability of patient's position in the images and the existence of collimation areas in some images; and no actual image content information, such as lung regions, is considered in the method.

Accordingly, there is a need for a system and method for automatically recognizing the projection view and the patient-relative orientation of chest radiographs which overcomes the shortcomings of the prior art. Such a method should be a robust method to automatically identify the projection view and orientation of chest radiographs.

SUMMARY OF THE INVENTION

One object of the present invention is to provide an automated method and system for identifying/recognizing the projection view of chest radiographs.

Another object of the present invention is to provide an automated method and system for automatically recognizing the patient-relative orientation of chest radiographs A further object of the present invention is to provide a system and method to correct the display orientation of the chest radiographs.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

Preprocessing chest radiographs comprises sub-sampling original images, segmenting the image into foreground, background and anatomy, then detecting the two lung regions and the mediastinum region from segmented images.

Classifying the projection view of chest radiographs includes searching for a spine midline and two lung centerlines using both the $0^{th}$-order X and Y direction derivative images, checking the characteristics of the detected spine midline and lung centerlines. If they satisfy the assumptions of PA/AP view, the input radiograph can be classified as a PA/PA view, otherwise as a LAT view.

Determining the orientation of chest radiographs is accomplished by analyzing the properties extracted from the detected spine midline, and locating the neck, abdomen, and heart position in the chest radiographs.

According to one aspect of the invention, there is provided a method for identifying a projection view and an orientation of a chest radiograph. The method includes the steps of: providing an input digital image of the chest radiograph; preprocessing the input digital radiographic image; classifying the view of the input digital radiographic image based on the preprocessed image; and determining the orientation of the input digital radiographic image.

The present invention provides some advantages. Features of the system and method promote robustness. For example, preprocessing of chest radiographs helps to avoid the interference of collimation areas and other noise. In addition, features used for classification are invariant to size and translation. Hence, it can handle a fair degree of orientation variance. Yet further, the system is not dependent on capture device characteristics, so accordingly, the system/method can be employed for digitized films as well as for digital x-ray images, for example, those obtained by means of CR and DR (digital radiography) techniques. Features of the system and method also promote efficiency. For example, the computation complexity is under O(n), where n is the total number of pixels in an image, which can be reduced if the classification is implemented on a sub-sampled coarse resolution image.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 3C and 3E show the $0^{th}$-order X and Y direction derivative image of PA view chest radiograph. FIGS. 3D and 3F show the $0^{th}$-order X and Y direction derivative image of LAT view chest radiograph.

FIG. 4A displays the position and length of these three lines. FIG. 4B is a graph illustrating their spatial relations.

FIG. 6A shows a starting point for searching the spine midline in the mediastinum region. FIGS. 6B and 6C shows the starting points for searching the left and right lung centerlines in the lung regions, respectively.

DETAILED DESCRIPTION OF THE INVENTION

Figure 1A:
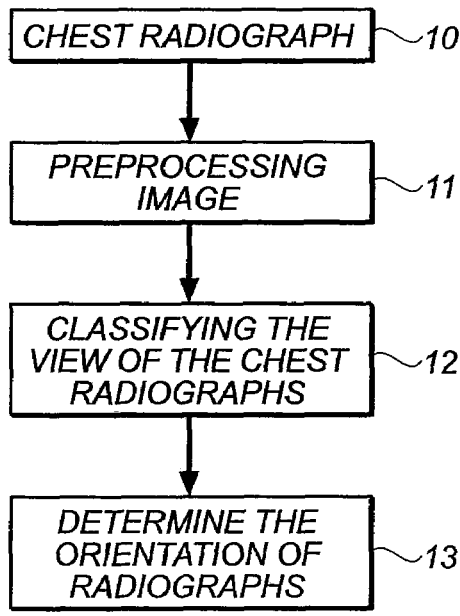
FIGS. 1A and 1B show flow diagrams illustrating the automated method for identifying the projection view and orientation of chest radiographs in accordance with the invention.

The following is a detailed description of the preferred embodiments of the invention, reference being made to the drawings in which the same reference numerals identify the same elements of structure in each of the several figures.

The present invention is directed to a system and method for automatically identifying the projection view and orientation of chest radiographic images. A flow chart of a method in accordance with the present invention is generally shown in FIG. 1A. As shown in FIG. 1A, the method includes three processing steps. First, the input chest radiograph image (step 10) is pre-processed (step 11). Then, three feature lines are detected and a set of features is extracted and compared with the general characteristics of chest PA/AP views to classify chest radiographs (step 12). Finally the orientation of the radiograph is determined (step 13).

Figure 1B:
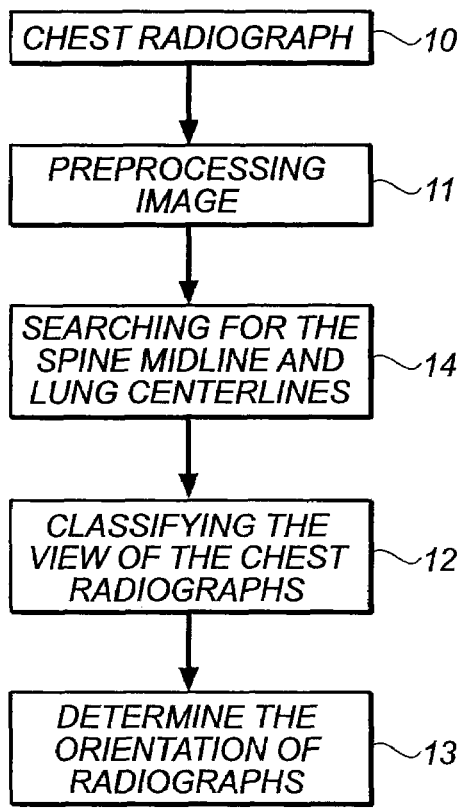

In a further embodiment, shown in the flow chart of FIG. 1B, an additional step can be applied prior to the classify the view of the chest radiographs. This additional step (step 14) is the searching for the spine midline and lung centerlines, and will be more particularly described below.

Figure 2A:
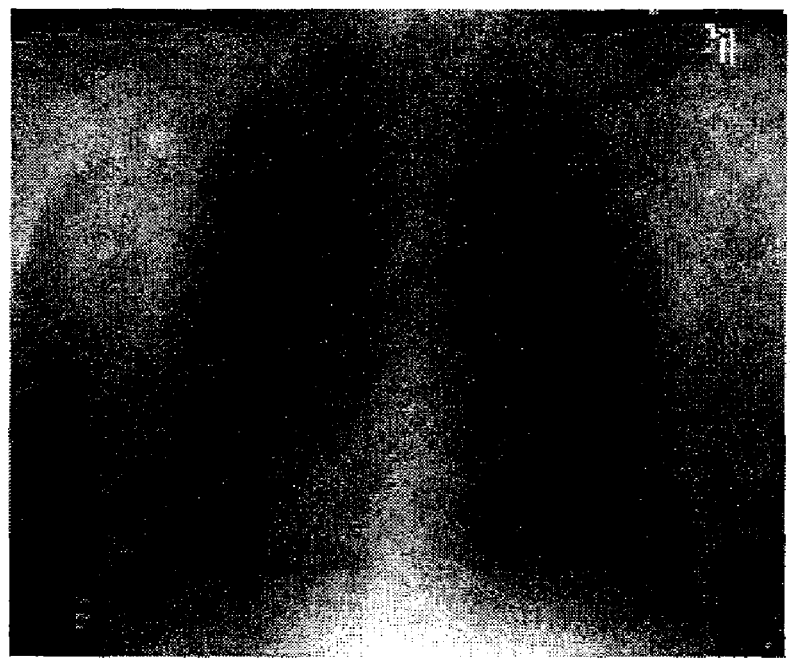
FIG. 2A and FIG. 2B display, respectively, a PA view chest radiograph and its segmented image obtained from the pre-processing.
Figure 2B:
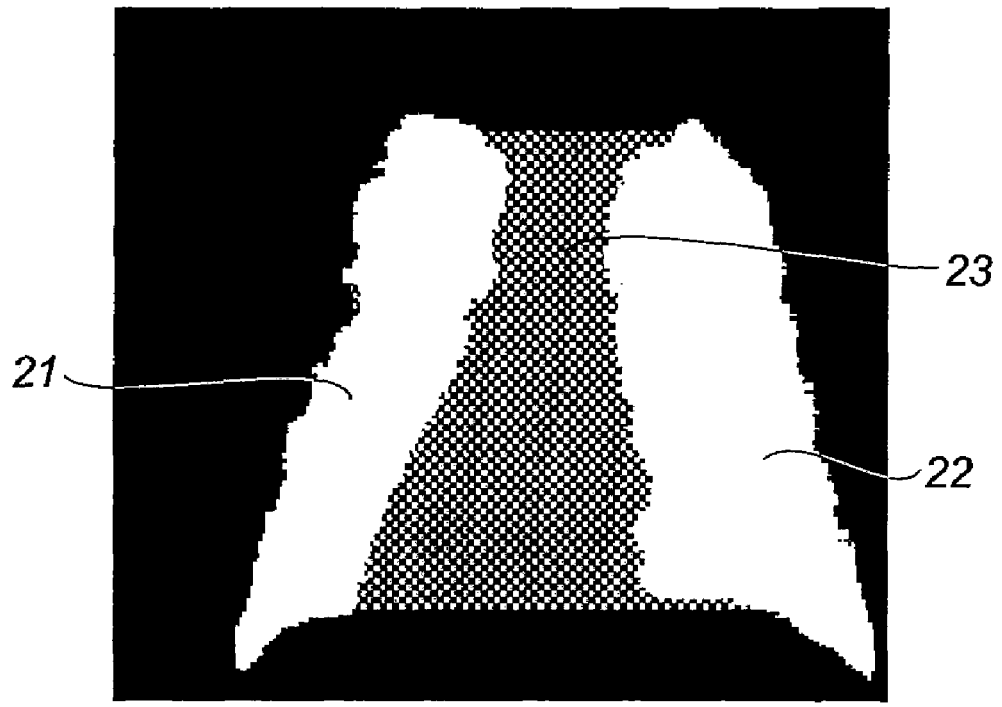

FIG. 2A shows an exemplary PA view chest radiograph and FIG. 2B shows its segmented image obtained from the pre-processing (step 11).

The pre-processing step (step 11) comprises sub-sampling the original image to provide a coarse resolution image, then segmenting the image into foreground, background and anatomy. Such a segmentation can be accomplished using methods known to those skilled in the art. One such segmentation method is disclosed in U.S. Ser. No. 10/625,919 filed on Jul. 24, 2003 by Wang et al. entitled METHOD OF SEGMENTING A RADIOGRAPHIC IMAGE INTO DIAGNOSTICALLY RELEVANT AND DIAGNOSTICALLY IRRELEVANT REGIONS, commonly assigned and incorporated herein by reference. The lung regions can then be detected from the anatomy. For the lung regions detected in FIG. 2A, the lung regions are shown as white regions (elements 21 and 22) in FIG. 2B. A mediastinum region is also detected from the anatomy. This region is shown as a grey region (element 23) in FIG. 2B. The detection of the lung regions and the mediastinum region can be accomplished using methods known to those skilled in the art. One suitable method is disclosed in U.S. Ser. No. 10/315,884 (Kodak Docket 85325) filed on Dec. 10, 2002 by Luo et al. entitled METHOD FOR AUTOMATED ANALYSIS OF DIGITAL CHEST RADIOGRAPHS, commonly assigned and incorporated herein by reference.

Figure 3A:
FIGS. 3A-3F show PA view and LAT view chest radiographs and their derivative images.
Figure 3B:
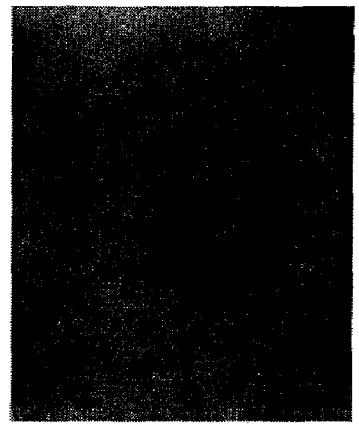
Figure 3C:
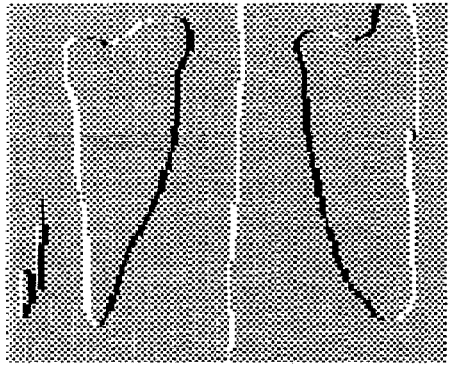
Figure 3D:
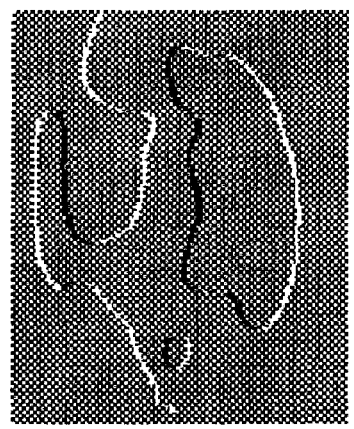
Figure 3E:
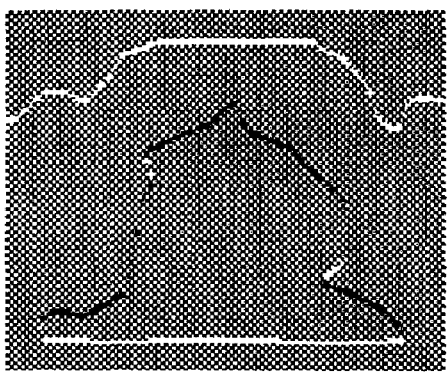
Figure 3F:
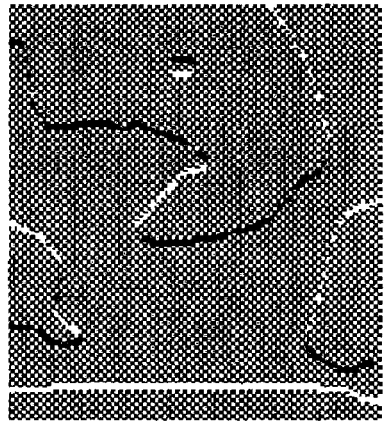

Reference is now made to FIGS. 3A-3F. Two chest radiographs, one with PA view and the other with LAT view, are shown in FIGS. 3A and 3B, respectively. Their corresponding $0^{th}$-order X and Y direction derivative image are shown in FIGS. 3C-3F, respectively. That is, FIGS. 3C and 3E show the $0^{th}$-order X and Y direction derivative image of the PA view chest radiograph of FIG. 3A. FIGS. 3D and 3F show the $0^{th}$-order X and Y direction derivative image of the LAT view chest radiograph of FIG. 3B.

The derivative images are computed by convoluting the input image I(x,y) with the derivative of a normalized Gaussian G(x,y,σ) at a particular scale σ.

$$I_n^\alpha(x,y,\sigma) = G_n^\alpha(x,y,\sigma) \otimes I(x,y)$$

The normalized Gaussian in two-dimensions is given by the equation:

$$G(x, y, \sigma) = \frac{1}{2\pi\sigma^2} \exp\left(\frac{-(x^2 + y^2)}{2\sigma^2}\right)$$

wherein $\otimes$ denotes convolution and $G_n^\alpha$ is the $n^{th}$-order derivative of the Gaussian kernel in the direction α.

In accordance with the present invention, α=0° corresponds to the +X direction, and α=90° stands for the +Y direction. The detection of extremes is performed by comparing each pixel(x,y) with its neighborhood. If a maximum is detected, the pixel will be set to 1 (e.g., white) in the derivative image. If a minimum is detected, the pixel will be set to −1 (e.g., black). Otherwise, the pixel will be treated as 0 (e.g., gray).

Figure 4A:
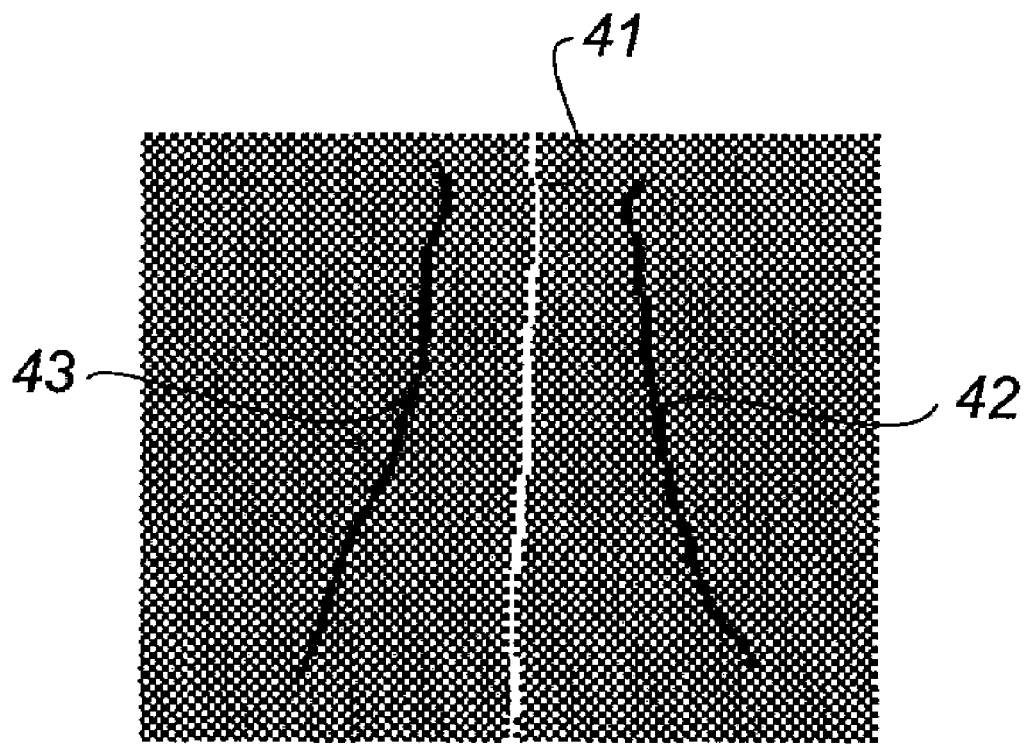
FIGS. 4A and 4B show the three lines extracted from the $0^{th}$-order X direction derivative image of PA view chest radiograph and their properties.

Observing FIG. 3C, the $0^{th}$-order X direction derivative image of PA view chest radiograph, this figure shows that one white line corresponding to the spine midline can be readily found near the center of the image and two black lines related to the centerlines of the left and right lung regions can be detected on the both sides of the spine midline, respectively. These properties and relation present the anatomical features which PA or AP view chest radiographs have. Based on such information, the following assumptions are employed in the present invention to identify the PA/AP view of chest radiographs. Specifically, referring to FIGS. 4A and 4B:

(1) If a chest radiograph is a PA/AP view, a white line (element 41) corresponding to the spine midline and two black lines (elements 42, 43) corresponding to lung centerlines should be found in the expected regions in its $0^{th}$ order X or Y direction derivative image. FIG. 4A illustrates the three lines (elements 41,42,43) extracted from the $0^{th}$-order X direction derivative image of the PA view chest radiograph. FIG. 4A displays the position and length of these three lines.

Figure 4B:
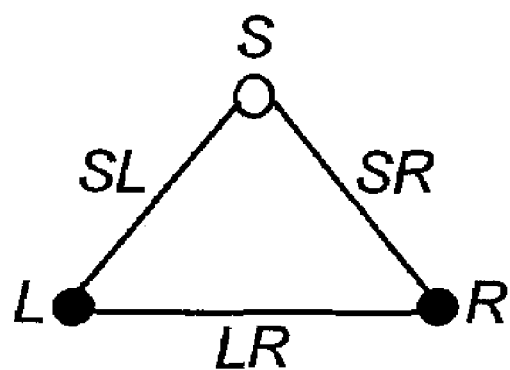

(2) If a chest radiograph is a PA/AP view, the length of the three detected lines which is related to the size of anatomical structures should be within a known range for human subjects. In addition, the orientation of the white line (element 41) is nearly parallel to either the X axis or Y axis as is the spine seen in most PA or AP view chest radiographs. FIG. 4B shows a graph illustrating the spatial relations of the three lines of FIG. 4A.

(3) If a chest radiograph is a PA/AP view, the two detected black lines (elements 42, 43) are generally mirror-symmetric with respect to the white line (element 41) as the spatial relationship of lungs versus the spine column.

Figure 5:
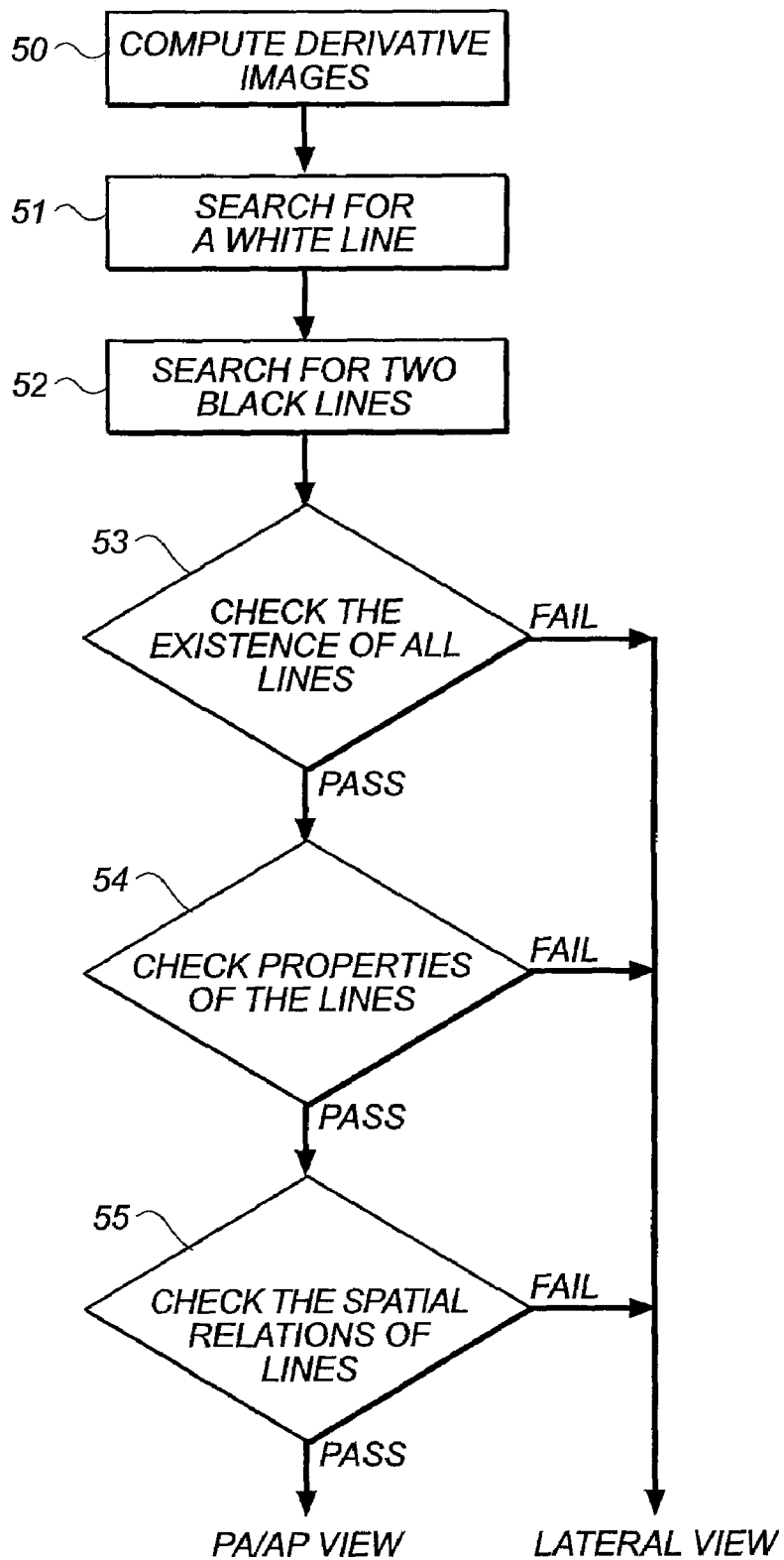
FIG. 5 is a block diagram illustrating the method for identifying the projection view of chest radiographs.

Referring now to FIG. 5, there is shown a flow chart illustrating a method for identifying the projection view of chest radiographs in accordance with the present invention so as to classify the view of the chest radiography. Generally, an input image is PA view is assumed, and then the image is verified with one or more of the above identified three assumptions. If all the assumptions are satisfied, the input image can be classified as a PA/AP view. Otherwise it is classified as a LAT view.

As shown in FIG. 5, the method first computes the derivative images (step 50), then searches for a white line corresponding to the spine midline (step 51) in the mediastinum region and two black lines (step 52), one in the detected left lung region and the other in the right lung region.

Based on the expected properties, three checks/verifications can be employed to determine if the detected lines are the spine midline or lung centerlines. One check is to verify the existence of the three lines (step 53). Another check verifies the properties of the three lines (step 54), and a third check compares the spatial relationships of the three lines against pre-defined spatial relationships (step 55). In a preferred embodiment, when all these checks are passed, the input image is classified as a PA/AP view. If not all passed, the input image is classified as a LAT view.

The search for the spine midline and lung centerlines is preferably implemented on both the $0^{th}$-order X and Y direction derivative images, since the image's orientation is unknown at this point.

Figure 6A:
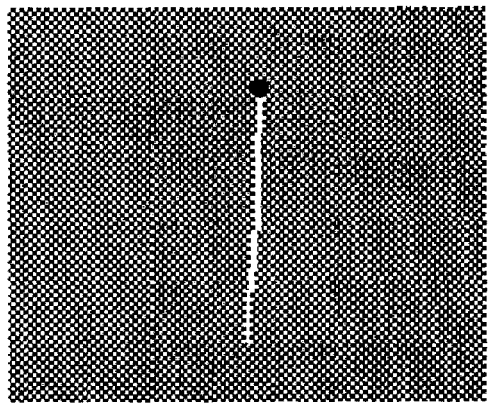
FIGS. 6A, 6B, and 6C are graphical views illustrating the way to locate the starting points for searching the segmented mediastinum and lung regions.
Figure 6B:
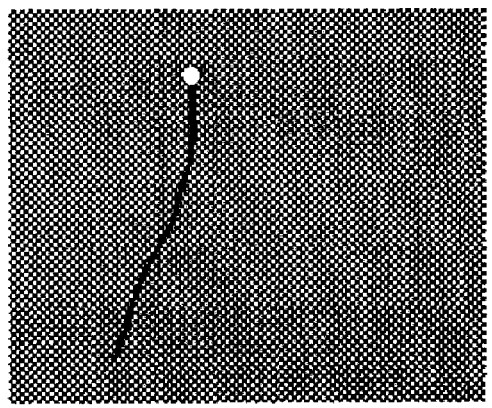
Figure 6C:
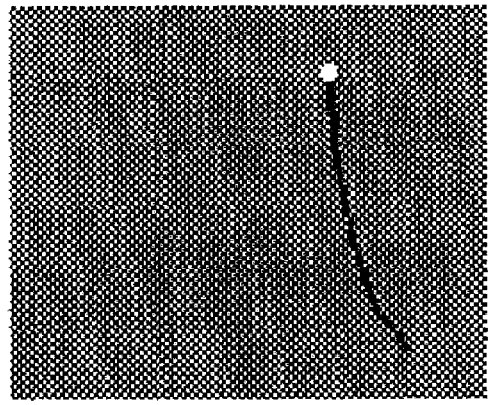

To conduct the search, an initial step is to locate three starting points in the segmented mediastinum and lung regions. FIGS. 6A, 6B, and 6C are graphical views illustrating the way to locate the starting points. FIG. 6A shows a starting point for searching the spine midline in the mediastinum region, while FIGS. 6B and 6C show the starting points for searching the left and right lung centerlines in the lung regions, respectively.

To conduct the search, as shown in each of FIGS. 6A-6C, only the image content within the mediastinum region or lung regions is kept and the rest of the image is ignored. By scanning the X direction derivative image row-by-row and the Y direction derivative image column-by-column, a first point is found and used as a starting point. In FIG. 6A, a black point is found, and in FIGS. 6B and 6C, a first white point is found and used as the starting point.

From these starting points, the remainder of the midline/centerline can be determined. This can be accomplished by tracing vertically up and down in the X direction derivative image and horizontally left and right in the Y direction derivative image. To avoid tracing outside the lung regions, a constraint is preferably applied to terminate the tracing. This can be accomplished, for example, using the intensity mean of the current point and its neighborhood. If the intensity mean is greater than a certain threshold, which means the current point is near or on the edge of lung regions, the tracing has to be terminated, otherwise the tracing continues.

Classifying the projection view of chest radiographs (step 12) can be accomplished by checking whether the detected lines satisfy the three assumptions, and, in a further embodiment, with a degree of confidence. For example, for a particular image, if a white line and two black lines can be extracted from the expected regions in its $0^{th}$-order X or Y direction derivative images and the position of the white line is near the center of the image, the image satisfies assumption 1, therefore passes the first check; otherwise, it fails and will be classified as LAT view.

The second check is based on two properties of anatomical structures that the detected lines represent.

One property is the shape of the white line, which is expected to be nearly straight as are most spines in PA or AP view chest radiographs. One technique to examine this property is to compute the curvature of the white line and its angle to the X-axis or Y-axis. If the curvature is low and a relatively small angle is obtained, the detected white line can be validated as the spine midline; otherwise the detected white line may represent noise in the image and has to be rejected. The following equations provides a way to compute the curvature/angles:

$$\alpha_x = \frac{\max(y \mid y \in (L(x, y)) - \min(y \mid y \in L(x, y))}{sizeof(L(x, y))} \text{ or}$$

$$\alpha_y = \frac{\max(x \mid x \in (L(x, y)) - \min(x \mid x \in L(x, y))}{sizeof(L(x, y))}$$

where $L(x,y)$ represents the white line. Another way to solve it is to compute an average distance of the white line versus a straight line, which is generated by starting from the first point of the white line and ending at the last point of it. A nearly straight white line should have a relatively small value of the average distance.

Another property is the length of the two black lines, which corresponds to the size of lung regions. Since the two lung regions are typically nearly mirror-symmetric to the spinal column in the PA or AP view chest radiographs, an overlap region of the three detected lines in the X or Y direction should exist. This provides a way to evaluate the size of lungs. The overlap length of the three lines can be computed from a projection profile generated by the equations:

$$P(y_i) = \sum_x wIp_0^{0°}(x_i, y_i) \quad \begin{matrix} w = 1 & Ip_0^{0°}(x_i, y_i) > 0 \\ w = -1 & Ip_0^{0°}(x_i, y_i) \le 0 \end{matrix} \text{ or}$$

$$P(x_i) = \sum_y wIp_0^{90°}(x_i, y_i) \quad \begin{matrix} w = 1 & Ip_0^{90°}(x_i, y_i) > 0 \\ w = -1 & Ip_0^{90°}(x_i, y_i) \le 0 \end{matrix}$$

where (i) $Ip_0^0(x_i, y_i)$ and $Ip_0^{90}(x_i, y_i)$ are the processed $0^{th}$ order X and Y direction derivative images respectively (in which there are only the detected lines as was illustrated in FIG. 4A) and (ii) w is a weight associated with the intensity value of the lines.

Figure 7A:
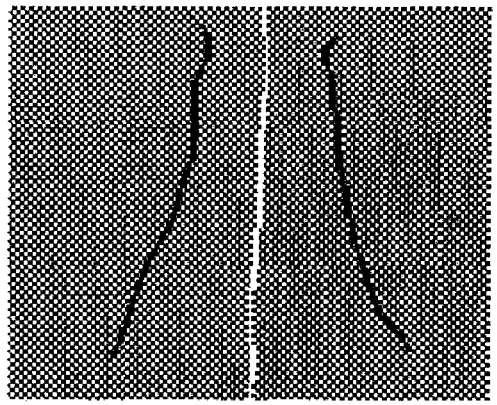
FIG. 7A illustrates the anatomical features of the lines.
Figure 7B:
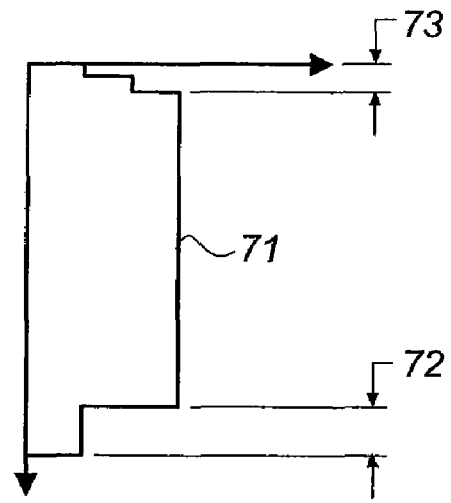
FIG. 7B is the profile used to compute the overlap length.

An exemplary projection profile is shown in FIG. 7B as element 71 for the anatomical features of the lines shown in FIG. 7A. FIG. 7B is the profile used to compute the overlap length.

The overlap length is defined as:

$$H = \Sigma f(P(y_i))$$

$$f(P(y_i)) = 1 \text{ if } P(y_i) = 3$$

$$f(P(y_i)) = 0 \text{ if } P(y_i) < 3$$

or $$H = \Sigma f(P(x_i))$$

$$f(P(x_i)) = 1 \text{ if } P(x_i) = 3$$

$$f(P(x_i)) = 0 \text{ if } P(x_i) < 3$$

where $f(P(y_i))$ or $f(P(x_i))$ is a function related to the property of the profile and its value is set to 1 only when the profile is equal to 3. In a typical situation, the value of the overlap length should be within a pre-defined range, which corresponds to the size of lung regions. If the overlap length is not within the range, the detected black lines may not correspond to the lung centerlines; therefore, they must be rejected.

Figure 7C:
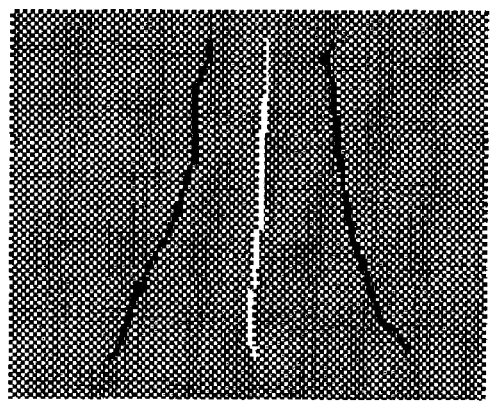
FIG. 7C shows the refined spine midline and lung centerlines.

The last step in this check is to refine the detected lines by modifying/cutting off the sections/portions of the lines that extend/lie outside the overlap region (shown as elements 72 and 73 in FIG. 7B). This step removes noise which exists in the detected lines and promotes that they correctly represent the anatomical structures, which greatly benefit the subsequent processing. FIG. 7C shows the refined spine midline and lung centerlines.

Having completed the second check, it is likely that the input image is either a PA or an AP view. However, the determination is dependent on a third check, which focuses on the spatial relation between the detected lines. Here, a graph match is employed. Each node in the graph is representative of a line, and edges connecting the nodes correspond to the spatial relations between the lines as shown in FIG. 4B. The following matrix is generated to represent the graph $$\begin{bmatrix} 0 & SL & SR \\ SL & 0 & LR \\ SR & LR & 0 \end{bmatrix}$$

where S represents the white line corresponding to the spine midline, L and R represents the two black lines in the lung regions.

The value of elements associated with the edges are determined by the following criteria:

1) Elements SL and SR represent the relationships between the detected spine midline and lung centerlines. Their values are derived by the relationship:

SX=1, IFF S∩X=Φ and Distance(S,X)∈C X={L,R}

SX=0, Otherwise where X is either the left lung centerline (L) or the right lung centerline (R). If the spine midline and lung centerlines don't touch each other (e.g., intersect) and their distance is within a certain range C, elements SL and SR are set to 1, otherwise 0.

2) Element LR, which describes the mirror-symmetrical relationship of the two lung centerlines versus the spinal midline, is given by:

LR=1, IF Distance(S,L)≈Distance(S,R)

LR=0, Otherwise

If the distances between the spine midline and left and right lung centerlines are similar, then element LR can be set to 1, otherwise 0.

For each input image, a graph matrix is (automatically) generated based on the above criteria. The graph matrix is then compared with a pre-defined matrix which represents the correct/desired relationship between the spine midline and lung centerlines, as shown in following pre-defined matrix:

$$\begin{bmatrix} 0 & 1 & 1 \\ 1 & 0 & 1 \\ 1 & 1 & 0 \end{bmatrix}$$

The third check is passed when the matrix derived from the image is identical to the pre-defined matrix. Once an image passes all three checks, it can be classified as a PA or AP view.

In a further embodiment of the present invention, the classification can be performed under a probabilistic framework, for example, by applying a confidence level to each check result. The confidence level represents how closely the check results compare with the distributions of those of most PA/AP view radiographs.

In a still further embodiment, a combination of some and/or all confidence levels is computed to give a score of radiograph. If such score is higher than a predetermined threshold, the input radiograph can be classified as PA/AP view, otherwise it can be rejected. An advantage of using a probabilistic framework, instead of rigidly checking, is that it allows ambiguity in radiographs and makes the classification results more robust.

Figure 8:
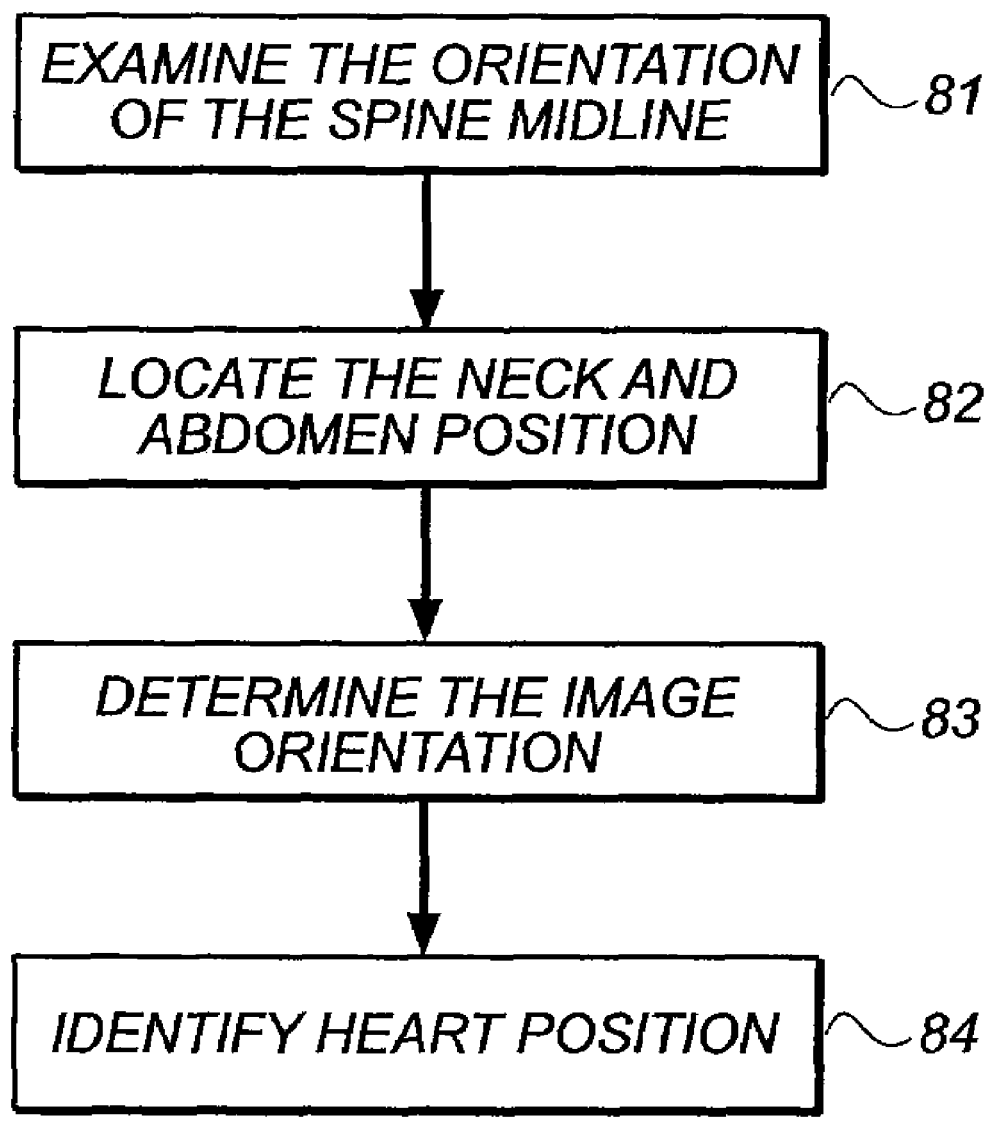
FIG. 8 is a block diagram illustrating the method for determining the orientation of a chest PA/AP radiograph.
Figure 9A:
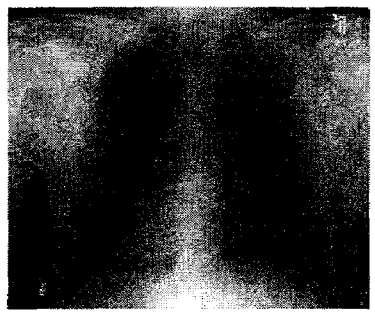
FIGS. 9A-9H demonstrate the eight orientations of a PA view chest radiograph.
Figure 9B:
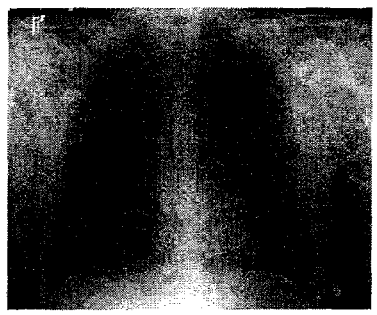
Figure 9C:
Figure 9D:
Figure 9E:
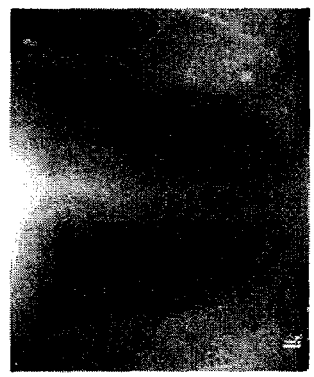
Figure 9F:
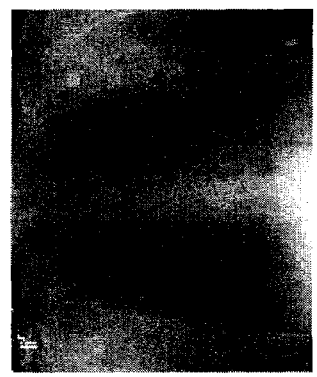
Figure 9G:
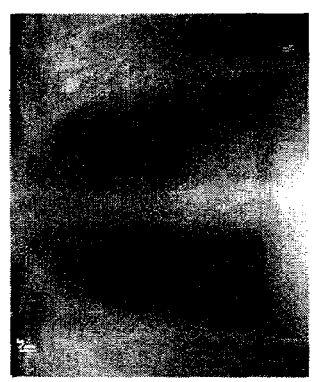
Figure 9H:
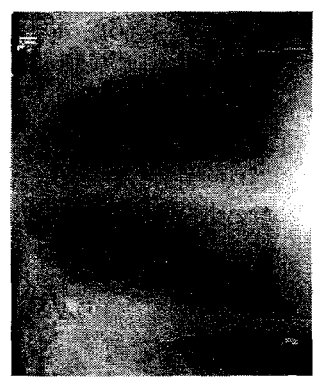

FIG. 8 shows a block diagram illustrating a method in accordance with the present invention for determining the orientation of a chest PA/AP view image. Generally, PA view chest radiographs have eight possible orientations, as illustrated in FIGS. 9A-9H.

To identify them, a first step is to detect the orientation of the spine midline (step 81 of FIG. 8), then locate the neck and abdomen position (step 82), and then determine the image orientation (step 83).

With regard to step 81, if the orientation is parallel to the Y axis, the chest has a portrait orientation in the image as shown in FIGS. 9A-9D, otherwise it has a landscape position as shown in FIGS. 9E-9H. For the images with landscape orientation, a 90 degree rotation is needed to orient the image.

Figure 10A:
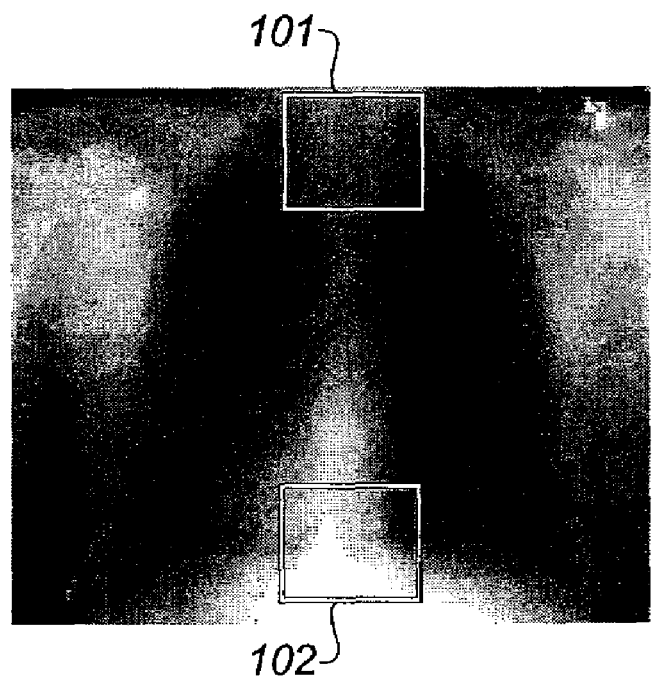
FIGS. 10A and 10B show the two regions of interest, which are used to determine the orientation of a PA/AP view chest radiograph.
Figure 10B:
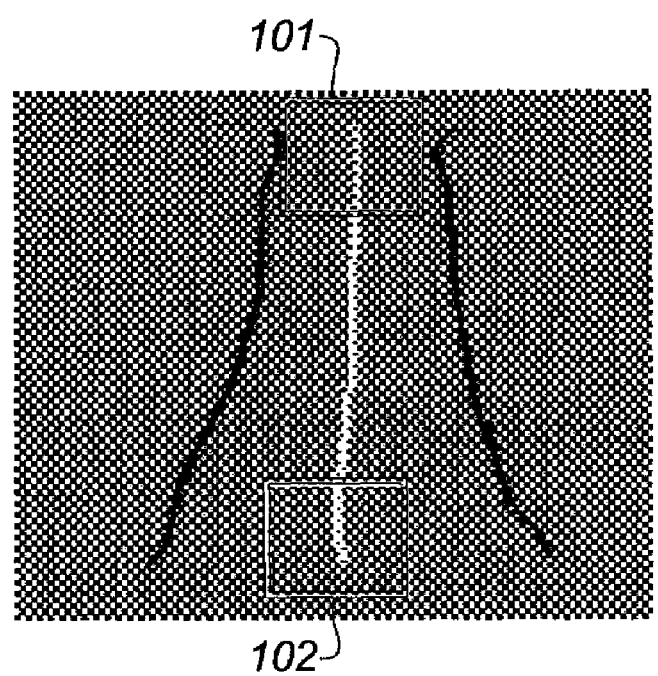

With regard to step 82, the second step is to locate the neck and abdomen position in the image. One way to accomplish this is to extract two regions from the original image as shown in FIGS. 10A and 10B. One region (101) is disposed on the top of the spine midline and the other region (102) is disposed at the bottom of the spine midline. The image orientation is determined by comparing the intensity means of these two regions (step 82). If the intensity mean of the top region is greater, which means that the abdomen is on the top, the image needs flip upside down; otherwise it has the correct orientation.

Figure 11A:
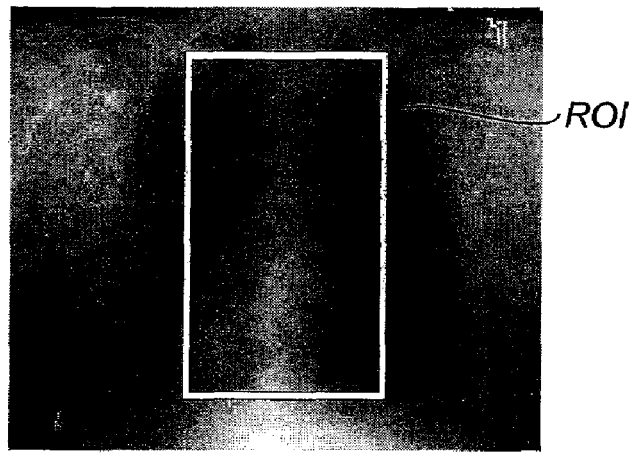
FIGS. 11A, 11B, and 11C display the region of interest used to determine a heart position in the PA/AP chest radiograph.
Figure 11B:
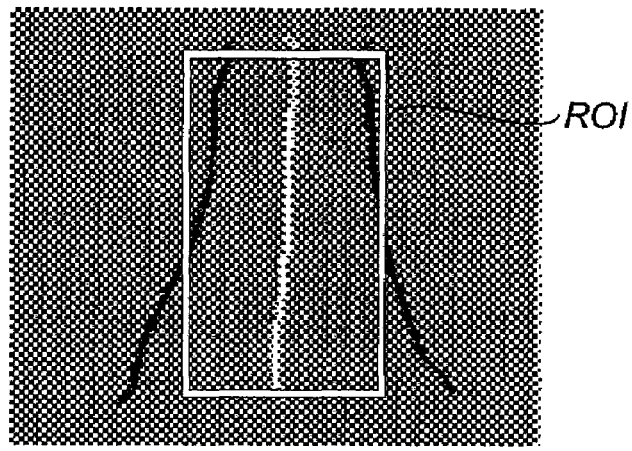

Another method to solve this problem is to analyze features of a profile derived from a region of interest (ROI). That is, the ROI is extracted from the original image as shown in FIG. 11A. The center of the ROI is the center of the spine midline with height set to the overlap length and width computed from the distance between the centers of two lung centerlines. A horizontal profile is computed and compared against the profiles from images with correct orientation.

Once a chest radiograph is reoriented, the chest is shown in top-down position as shown in FIG. 11A. However, some doctors prefer viewing the radiograph with the patient's left side presented on the right side of the display. In other words, the heart is shown on the right side of images. Thus, optionally, identifying the heart position in image can be relevant (step 84 of FIG. 8).

According to a further embodiment of the present invention, a method is provided for detecting the heart position. The method is comprised of a training stage and testing stage.

Figure 11C:
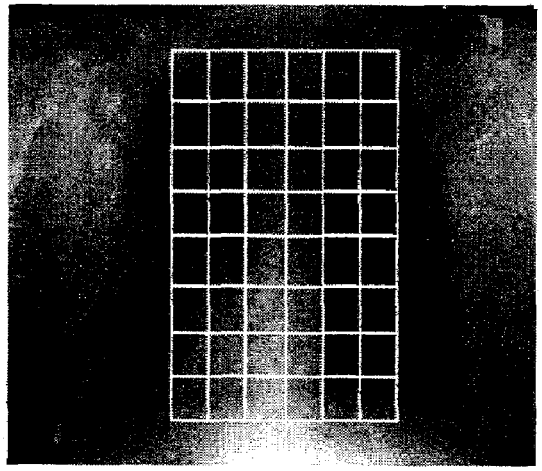

The training stage comprises the steps of:
1. Constructing N*N patches inside the ROI, as shown in FIG. 11C.
2. Computing a set of features for each N*N patch. Possible features are the grey level mean at the patch, or its multi-order X and Y direction derivatives. Associate an output specifying the heart position (left or right).
3. Computing a suitable transformation for vectors of the feature set. Examples of transformations include normalization, feature selection, feature extraction by principle component analysis, or non-linear transformation to create new, extra features. This computational step is optional if the original features are sufficient for classification.
4. Training a classifier with the input feature vectors and the output.

The testing stage comprises the steps of:
1. Computing the feature vectors from the test images.
2. An optional step of applying the transformation used in the training step to each feature vector.
3. Classifying the feature vectors using the trained classifier.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 Step—Chest radiograph
11 Step—Preprocessing image
12 Step—Classifying the view of chest radiographs
13 Step—Determine the orientation of radiographs
14 Step—Searching for spine midline and lung centerlines
21 lung region
22 lung region 23 mediastinum region
41 spine midline
42 lung centerline
43 lung centerline
50 Step—Compute derivative image
51 Step—Search for a white line
52 Step—Search for two black lines
53 Step—Check the existence of all lines
54 Step—Check properties of lines
55 Step—Check the spatial relations of lines
71 Projection profile
72 section extending outside overlap region
73 section extending outside overlap region
81 Step—Exam the orientation of the spine midline
82 Step—Locate the neck and abdomen position
83 Step—Determine the image orientation
84 Step—Identify the heart position
ROI Region of Interest

The invention claimed is:

1. A method for identifying an AP/PA (anterior-posterior/posterior-anterior) projection view and an orientation of a chest radiograph, the method comprising the steps of:
   providing an input digital image of the chest radiograph;
   preprocessing the input digital radiographic image;
   searching the preprocessed image for a spine midline and lung centerlines;
   classifying the view of the input digital radiographic image as an AP/PA image based on the detection of a spine midline and lung centerlines; and
   determining the orientation of the input digital radiographic image using the detected spine midline and lung centerlines, if it is classified as an AP/PA image.

2. The method of claim 1, wherein the step of preprocessing comprises the steps of:
   sub-sampling the input digital radiographic image;
   segmenting the sub-sampled image into foreground, background, and anatomy regions; and
   detecting two lung regions and a mediastinum region from the anatomy region.

3. The method of claim 1, wherein the step of classifying the view of said input digital radiographic image includes the steps of:
   computing a X and Y direction derivative image of the input digital radiographic image; and
   reviewing the X and Y direction derivative images to identify three lines, one line being representative of a spine midline and two lines being representative of lung centerlines.

4. The method of claim 3, further comprising the steps of:
   verifying the existence of the three lines;
   determining the properties of the three lines; and
   determining the spatial relationships of the three lines.

5. The method of claim 3, wherein the step of identifying the three lines is accomplished by the steps of:
   assigning a first value to a maximum value of the X and Y direction derivative image to identify the spine midline; and
   assigning a second value to a minimum value of the X and Y direction derivative image to identify the lung centerlines.

6. The method of claim 3, wherein the step of determining the properties of the three lines includes the steps of:
   assigning a first value to a maximum value of the X and Y direction derivative image to identify the spine midline;
   assigning a second value to a minimum value of the X and Y direction derivative image to identify the lung centerlines;
   identifying a shape feature of the spine midline; and
   determining if there is an overlap length of the spine midline with the lung centerlines.

7. The method of claim 4, wherein the step of determining the spatial relationships of the three lines is accomplished by the steps of:
   determining whether the three lines intersect; and
   determining the distance between the three lines.

8. The method of claim 1, wherein the step of determining the orientation of the input digital radiographic image includes the steps of:
   examining the orientation of a spine midline;
   locating a neck and abdomen position; and
   determining the image orientation responsive to the orientation of the spine midline and location of the neck and abdomen positions.

9. The method of claim 8, wherein the step of locating the neck and abdomen position in the image is accomplished by comparing an intensity means of two regions extracted along the spine midline.

10. The method of claim 8, wherein the step of locating the neck and abdomen position in the image is accomplished by comparing a profile extracted from a region of interest in the image to at least one profile from a predetermined oriented image.

11. The method of claim 1, wherein:
   (A) the step of classifying the view of said input digital radiographic image includes the steps of:
      (i) computing a X and Y direction derivative image of the input digital radiographic image;
      (ii) reviewing the X and Y direction derivative images to identify three lines, one line being representative of a spine midline and two lines being representative of lung centerlines; and
   (B) the step of determining the orientation of the input digital radiographic image includes the steps of:
      (i) examining the orientation of the spine midline;
      (ii) locating a neck and abdomen position; and
      (iii) determining the image orientation responsive to the orientation of the spine midline and location of the neck and abdomen positions.

12. The method of claim 8, further comprising the step of, after determining the image orientation, identifying a position of a heart.

13. The method of claim 12, wherein the step of identifying the heart position includes a training step and a testing step.

14. The method of claim 13, wherein the training step includes the steps of:
   constructing N*N patches within a region of interest of the input digital radiographic image;
   computing a set of features for each patch;
   associating an output specifying the heart position;
   computing a transformation for the feature set; and
   training a classifier with the feature set and the output.

15. The method of claim 14, wherein the testing step includes the steps of:
   computing the feature set for at least one test image;
   applying the transformation used in the training step to each feature set; and
   classifying the feature set using the trained classifier.

16. A computer storage product having at least one computer storage medium having instructions stored therein causing one or more computers to perform the method of claim 1.

17. A method for identifying a projection view of a chest radiograph, the method comprising the steps of:
providing an input digital image of the chest radiograph;
preprocessing the input digital radiographic image;
searching the preprocessed image for a spine midline and lung centerlines; and
classifying the view of the input digital radiographic image as an AP/PA (anterior-posterior/posterior-anterior) image based on the detection of a spine midline and lung centerlines and as a LAT (lateral) image, otherwise.

18. The method of claim 17, wherein the step of preprocessing comprises the steps of:
sub-sampling the input digital radiographic image;
segmenting the sub-sampled image into foreground, background, and anatomy regions; and
detecting two lung regions and a mediastinum region from the anatomy region.

19. The method of claim 17, wherein the step of classifying the view of said input digital radiographic image includes the steps of:
computing a X and Y direction derivative image of the input digital radiographic image; and
reviewing the X and Y direction derivative images to identify three lines, one line being representative of a spine midline and two lines being representative of lung centerlines.

20. The method of claim 19, further comprising the steps of:
verifying the existence of the three lines;
determining the properties of the three lines; and
determining the spatial relationships of the three lines.

21. The method of claim 19, wherein the step of identifying the three lines is accomplished by the steps of:
assigning a first value to a maximum value of the X and Y direction derivative image to identify the spine midline; and
assigning a second value to a minimum value of the X and Y direction derivative image to identify the lung centerlines.

22. The method of claim 19, wherein the step of determining the properties of the three lines includes the steps of:
assigning a first value to a maximum value of the X and Y direction derivative image to identify the spine midline;
assigning a second value to a minimum value of the X and Y direction derivative image to identify the lung centerlines;
identifying a shape feature of the spine midline; and
determining if there is an overlap length of the spine midline with the lung centerlines.

23. The method of claim 20, wherein the step of determining the spatial relationships of the three lines is accomplished by the steps of:
determining whether the three lines intersect; and
determining the distance between the three lines.

* * * * *